US005522580A

United States Patent [19]

Varner, Jr. et al.

[11] Patent Number: 5,522,580

[45] Date of Patent: *Jun. 4, 1996

[54] REMOVING STAINS FROM FIXED ITEMS

[75] Inventors: Thomas L. Varner, Jr., Williamsburg; Timothy W. Blount, Poquoson; Charles R. Minns, Williamsburg, all of Va.

[73] Assignee: BASF Corporation, Parsippany, N.J.

[ * ] Notice: The term of this patent shall not extend beyond the expiration date of Pat. No. 5,389,278.

[21] Appl. No.: 83,148

[22] Filed: Jun. 25, 1993

Related U.S. Application Data

[63] Continuation-in-part of Ser. No. 462,919, Jan. 8, 1990, Pat. No. 5,252,243, which is a continuation of Ser. No. 206,531, Jun. 14, 1988, abandoned.

[51] Int. Cl.[6] .......... C09K 15/06

[52] U.S. Cl. .......... 252/102; 252/94; 252/95; 252/103; 252/104; 252/156; 252/186.29; 252/186.31

[58] Field of Search .......... 252/94, 95, 102, 252/103, 104, 111, 156, 186.31, 99, 186.29; 8/111, 137; 134/42

[56] References Cited

U.S. PATENT DOCUMENTS

| | | | |
|---|---|---|---|
| 3,528,115 | 9/1970 | Lawes et al. | 8/111 |
| 3,607,760 | 9/1971 | McIntyre | 252/104 |
| 3,838,967 | 10/1974 | Shepley | 8/111 |
| 4,347,149 | 8/1982 | Smith et al. | 252/102 |
| 4,377,489 | 3/1983 | King | 252/99 |
| 4,497,725 | 2/1985 | Smith et al. | 252/102 |
| 4,539,007 | 9/1985 | Rosch et al. | 8/111 |
| 4,539,130 | 9/1985 | Thompton et al. | 252/94 |
| 4,609,475 | 9/1986 | Hanlon et al. | 252/8.55 B |
| 5,002,684 | 3/1991 | Beck et al. | 252/105 |
| 5,196,134 | 3/1993 | Jackson | 252/103 |
| 5,348,556 | 9/1994 | Minns et al. | 8/137 |
| 5,389,278 | 2/1995 | Minns et al. | 252/102 |

FOREIGN PATENT DOCUMENTS

| | | |
|---|---|---|
| 611808 | 12/1989 | Australia . |
| 0141759 | 5/1985 | European Pat. Off. . |
| 0346835 | 12/1989 | European Pat. Off. . |
| 1590651 | 5/1970 | France . |
| 2072643 | 10/1981 | United Kingdom . |

*Primary Examiner*—Ponnathapura Achutamurthy

[57] ABSTRACT

A method for removing various stains from stained fixed items uses an aqueous cleaning composition having a pH of at least about 9.0 and composed of up to about 30 percent by total composition weight of a wetting agent containing 1 to about 5 carbon atoms; between about 3 and about 15 percent by total composition weight of a peroxyhydrate oxidizing agent; and a pH adjustment substance.

6 Claims, No Drawings

REMOVING STAINS FROM FIXED ITEMS

CROSS-REFERENCE TO RELATED APPLICATIONS

This is a continuation-in-part of patent application Ser. No. 07/462,919, filed Jan. 8, 1990, now U.S. Pat. No. 5,252,243, which is a continuation of patent application Ser. No. 07/206,531, filed Jun. 14, 1988, now abandoned.

FIELD OF THE INVENTION

This invention relates to aqueous cleaning compositions and, more particularly, relates to an aqueous cleaning composition having the ability to remove stains from carpets, upholstery and other bulky items made from synthetic fibers.

BACKGROUND OF THE INVENTION

The terms "stain" and "staining" as used herein with reference to synthetic fibers mean discoloration of the fibers caused by a reaction with a chemical substance. Acid dyes are representative of a staining material for nylon fibers.

The terms "fixed item" or "fixed items" as used herein refers to articles made from synthetic polymer fibers which articles are too large, bulky or have some other characteristic which makes the articles impractical to remove for conventional laundering or dry cleaning. Throughout this document, the term "carpet" may be used to provide clarity. It is intended that the use of the term "carpet" embraces other fixed items as well.

The terms "fiber" or "fibers" as used herein include fibers of extreme or indefinite length (i.e. filaments) and fibers of short length (i.e. staple). The terms "yarn" or "yarns" as used herein mean a continuous strand of fibers.

Carpets containing synthetic polymer fibers are a popular floor covering for both residential and commercial applications. Synthetic polymer fibers are also popular for making upholstery and wall coverings. Such fibers make carpets, upholstery, etc., that are relatively inexpensive and have a combination of desirable qualities, such as durability, comfort, safety, warmth, and quietness.

Various types of synthetic polymer fibers are used in making carpets, upholstery and the like. Two popular synthetic polymer fibers utilized in carpets are polyamide fibers, such as nylon 6, and nylon 6/6, and polyester fibers.

The fibers contained in the carpets and other fixed items are severely and permanently stained when contacted, such as by inadvertent spilling, with certain artificial and natural colorants present in household items, such as tea, coffee beverages made from coffee beans, and soft drink beverages. Carpets, upholstery and other similarly large or bulky items cannot be removed for cleaning because of the expense involved in doing so or the potential damage to the item. For example, a wall-to-wall carpet is nearly impossible to remove for cleaning because furniture must be removed from the room, etc. Even if it were feasible to remove the carpet, laundering facilities are not equipped with machines large enough to handle the carpet. Even if conventional laundering was possible, it is likely that the fixed item would lose its appearance in the conventional process. As a result, unsightly stains cause carpets and other fixed items to be replaced even though the item has not been worn out.

In an attempt to prevent undesirable staining of fibers and, particularly, fibers contained in carpets, it has been proposed that the fibers be treated with a material which makes the fiber resistant to staining. Examples of such materials are condensation products made from aromatic sulfonic acids, and formaldehyde. Although such materials have been somewhat successful in imparting stain resistance, certain problems remain. For instance, many of the materials reduce staining of fibers, but do not totally eliminate it. In addition, traffic on carpet wears off the materials, which leaves the resulting fibers of the carpet with little or no protection against staining.

Colored food beverages, such as colored soft drink beverages, tea beverages, and coffee beverages made from coffee beans, present a serious staining problem to synthetic fibers. Coffee stains are particularly unsightly because of their dark brown color. Also, coffee stains are notoriously difficult to remove from many synthetic fibers. Other common household and commercial products also severely stain synthetic materials.

Various fluorochemicals have been applied to carpet fibers in order to reduce their water and oil wettability. The fluorochemical reduces the tendency of soils to adhere to the fibers, thereby making the removal of soils from the carpet fibers easier than if the fluorochemicals were omitted, but offers little protection to the carpet fibers from spills containing acid dye colorants unless the colorants are immediately removed from the fibers. In addition, traffic on the carpet wears off the fluorochemicals.

A number of cleaning solutions have been proposed in the past for removing stains from fibers. For instance, volatile solvent dry-cleaning fluids have been proposed, but such fluids are less than satisfactory in removing water-soluble stains. In addition, aqueous compositions containing synthetic detergents have been proposed for removing stains from fibers, but such compositions have not been found to be particularly effective and tend to leave dirt collecting residues. As a result thereof, the carpet fibers become tacky due to a film of detergent. The film attracts and retains soils, which results in a cleaned carpet that will soil more easily after a cleaning than prior thereto.

One of the problems with cleaning solutions is that while they may, at times, loosen and/or disperse the soil, they fail to pick up or retain the soil, which results in the soil being redeposited on the fibers. Furthermore, they are not very effective against difficult stains, such as acid and coffee stains. Still further, since acid and coffee stains are believed to bond chemically with the fiber, aqueous detergent compositions are not particularly effective and many times it is difficult to remove all of the detergent from the fiber surface, even when rinsed with large amounts of water or steam.

Another problem with cleaning agents is that they may damage the fiber or its properties, e.g., color, strength, etc. Many available cleaning agents are either too harsh or, if sufficiently mild, ineffective against stains.

The present invention provides a cleaning composition suitable for removing stains from synthetic polymer fibers which overcomes, or at least mitigates, many of the above-described problems.

SUMMARY OF THE INVENTION

Accordingly, the present invention is a method of removing various stains from stained fixed items by contacting the stains with an aqueous cleaning composition having a pH of at least about 9.0 which contains up to about 30 percent by total composition weight of a wetting agent, between about 3 and about 15 percent by total composition weight of a peroxyhydrate oxidizing agent and a pH adjustment substance.

It is an object of the present invention to provide a method for removing stains from fixed items.

Related objects and advantages will be apparent to one ordinarily skilled in the art after reviewing the following description.

DETAILED DESCRIPTION OF THE PREFERRED EMBODIMENTS

To promote an understanding of the principles of the present invention, descriptions of specific embodiments of the invention follow, and specific language describes the same. It will nevertheless be understood that no limitation of the scope of the invention is thereby intended, and that such alterations and further modifications, and such further applications of the principles of the invention as discussed are contemplated, as would normally occur to one ordinarily skilled in the art to which the invention pertains.

Wetting agents which are suitable in the cleaning composition of the present invention are varied. Generally, preferable wetting agents are miscible with water and organically based. Two classes of useful wetting agents are glycols and lower aliphatic alcohols. Exemplary alcohols include water-soluble alcohols containing up to 5 carbon atoms, such as methyl alcohol, ethyl alcohol, n-propyl alcohol, isopropyl alcohol, sec-butyl alcohol, tert-butyl alcohol. The presently preferred alcohol is isopropyl alcohol. It will be understood that the wetting agents presented here are exemplary and not limiting. Water miscible and organically based wetting agents other than alcohols may be used.

Oxidizing agents that find particular application in the invention include peroxyhydrates. The term "peroxyhydrate", as used herein, means hydrogen peroxide or any compound which, in an aqueous composition, yields hydrogen peroxide. Examples of such compounds include alkali metal peroxides, such as sodium peroxide and potassium peroxide, sodium perborate monohydrate and tetrahydrate, sodium persulfate, sodium percarbonate, sodium peroxydihydrate, various phosphate peroxyhydrates, such as sodium or potassium peroxydiphosphate, potassium carbonate peroxydihydrate, and organic peroxyhydrates such as urea peroxide. The presently preferred oxidizing agent is hydrogen peroxide.

The amount of oxidizing agent and wetting agent utilized in the aqueous cleaning composition may vary over a wide range. The amount of oxidizing agent employed is generally an amount in the range of from about 3 to about 15 percent by weight of aqueous composition and, preferably, about 10 percent by weight of aqueous composition. The amount of wetting agent is preferably present up to about 30 percent by weight of aqueous composition and, more preferably, about 1 to about 5 weight percent based on the weight of the aqueous composition.

The precise manner that the aqueous composition functions to remove stains is not fully understood and need not be. It is believed that the aqueous composition oxidizes colored high molecular compounds to colorless lower molecular weight compounds. In any case, the observable effect is that the utilization of the aqueous solution containing the peroxyhydrate and wetting agent very effectively removes, or at least substantially reduces, soils and stains, particularly coffee stains, in the fibers. In addition, certain wetting agents, like isopropyl alcohol, appear to assist in the stain and soil removal and promote drying of the cleaned fiber. The cleaning effect occurs without any appreciable detrimental effect to the fibers.

In the practice of the invention, it is desirable that the pH of the aqueous composition be in the range of from about 9.0 to about 12.0 and, more preferably, about 10. The pH can be adjusted using acidic or alkaline compounds well known in the art. Exemplary compounds for adjusting the pH of the composition include sodium hydroxide, potassium hydroxide, ammonium hydroxide, sodium carbonate, trisodium phosphate and tetrasodium pyrophosphate. Other pH adjustment substances useful with the present invention will be apparent to those ordinarily skilled in the art.

The presently preferred aqueous composition has a pH of about 9.6 and comprises hydrogen peroxide present at about 10 percent by weight of aqueous composition and isopropyl alcohol present at about 1 to 5 percent by weight of aqueous composition. Deionized water is preferably the remaining ingredient.

The aqueous composition can be prepared by mixing together the wetting agent, oxidizing agent, and water in any order. Prior to utilizing the composition, its pH will usually have to be adjusted.

More preferably the cleaning agent is initially prepared as a two-component separated system, mixed just prior to application. Composition stability is greatly enhanced through the two-part solution. A first component (Part A) comprises the wetting agent and the pH adjustment substance. The second component (Part B) contains the oxidizing agent and water. Preferably, the water is deionized. The two-part system is quite stable and thereby does not require stabilizers as in other known similar cleaning solutions. Part A preferably contains about 4 percent isopropanol, about 1.3 percent ammonia and about 94.7 percent deionized water. Part B preferably contains about 18.8 percent hydrogen peroxide and about 81.2 percent deionized water.

The two parts may be provided in a number of ways. For example, the parts may be provided in two separate containers and mixed in equal parts (or as required to obtain the desired final formulation) in a third container soon before use. The mixture is then applied to the stained material according to the method described herein. Alternatively, the two parts may be supplied in a single partitioned container where the partition prevents the parts from mingling prior to use. This type of container may be fitted with a spray nozzle which draws from each part and mixes the parts in the spray. Advantageously, this type of nozzle is provided with one-way valves to prevent the mixed solution from flowing back into the receptacles. Also, the two parts can be separately sprayed in appropriate volumes directly onto the stain.

The method of cleaning using the cleaning composition comprises applying the aqueous composition to the fibers to be cleaned and removing the composition together with the stain. The residue may be removed by rinsing, scrubbing, vacuuming, sweeping, brushing, and the like. Alternatively, the composition may be blotted and air-dried. The amount of aqueous composition applied will depend on the severity of the staining encountered. For severe staining, more than one application of the cleaning composition may be desired. In addition, the cleaning composition should remain on the fibers for a period of time that ensures proper cleaning of the stains. After removing the composition from the fibers, the fibers may be washed with water to thoroughly remove the cleaner.

A desirable feature of utilizing the composition for cleaning stained fibers is that efficacious cleaning occurs thereon without leaving a residue. In addition, the use of the cleaning composition does not impair the color, even dyed colors, of the fibers.

Generally, any synthetic fiber may be cleaned utilizing the cleaning composition of the present invention. Examples of such fibers include those made from synthetic thermoplastic polymers which are capable of being formed into fibers such as by melt extrusion including polyolefins, for example, homopolymers of olefins such as low-density polyethylene, high-density polyethylene, polypropylene, and the like. Copolymers of olefins with other ethylenically unsaturated monomers such as ethylene-propylene copolymers and ethylenebutene copolymers and the like find particular application in the present invention.

The present invention finds particular application with fibers made from polyamides. Examples of such polyamides include homopolyamides and copolyamides which are obtained by the polymerization of lactam or aminocaprionic acid or a copolymerization product from mixtures of diamines together with dicarboxylic acids or mixtures of lactams.

Typical polyamides include nylon 6, nylon 6/6, nylon 6/10, nylon 6/12, nylon 11, nylon 12, copolymers thereof, or mixtures thereof. Polyamides can be also copolymers of nylon 6 or nylon 6,6 and a nylon salt obtained by reacting a dicarboxylic acid component such as terephthalic acid, isophthalic acid, adipic acid or sebacic acid with a diamine such as hexamethylenediamine or 1,4-bisaminomethylcyclohexane.

The present invention finds particular application also with fibers made from polyester. The preferred polyesters are the linear terephthalate polyesters, i.e., polyesters of a glycol containing from 2 to 20 carbon atoms and a dicarboxylic acid component comprising at least about 75 percent terephthalic acid. The remainder, if any, of the dicarboxylic acid component may be any suitable dicarboxylic acid such as sebacic acid, adipic acid, isophthalic acid, sulfonyl-1,4-4-dibenzoic acid, or 2,8dibenzofurandicarboxylic acid. Examples of linear terephthalate polyesters which may be employed include poly(ethylene terephthalate), poly(butylene terephthalate), poly(ethylene terephthalate/5-chloroisophthalate),poly(ethylene terephthalate), poly(butylene terephthalate), poly(ethylene terephthalate/5-chloroisophthalate), poly(ethylene terephthalate/5-[sodium sulfo]-isophthalate), and poly(cyclohexane-1,4-dimethylene terephthalate/hexahydroterephthalate).

The present invention can also be utilized with fibers comprising polyacrylonitrile homopolyers and copolymers. The term "polyacrylonitrile" as used herein means a synthetic polymer composed of at least 85 percent by weight acrylonitrile monomer units $$(-CH_2-\underset{\displaystyle CN}{\underset{|}{CH}}-).$$

Up to 15 percent of the polymer can be comprised of a vinyl monomer which is copolymerizable with acrylonitrile such as methyl acrylate, methyl methacrylate, vinyl acetate, and vinyl derivatives containing sulfo or carboxyl groups.

The method and composition of the present invention has been found to be efficacious with stains resulting from mercurochrome, black currant cordial, grape juice, hot beef gravy, hot chocolate, orange juice, hot tea, red wine, mustard, A1® sauce, ketchup, blue toilet cleaner, copier toner, Clearasil® ointment, merthiolate, Hawaiian Punch® drink, cranberry juice, hot tomato soup, Betadine®, orange soda, liquid shoe polish, black hair dye, lipstick, permanent ink, cherry Kool-Aid® drink, iodine, cola and Gatorade® drink. The invention was not tested on every possible type of stain, but it should be apparent that other stains will be removed with the composition of the present invention. Therefore, the examples should not be considered as limiting the usefulness of the present invention. It will be noted from the examples that a few stains were darkened by the composition but, in general, the results for most stains were excellent.

The invention is further exemplified by the examples below, which are presented to illustrate certain specific embodiments of the invention, but are not intended to be construed so as to be restrictive of the spirit and scope thereof. In the following examples, parts are parts volume.

In the following examples, natural-colored (white) cut-pile and loop-pile carpets are used as the stained media. The formulation's effectiveness, as determined by an Applied Color Systems (ACS) Colorimeter, ranges from 90% removal of a stain's color to slightly less than 1%. Several of the stains are darkened by the formulation, as indicated by negative stain-removal percentages.

The percentages of stain removal are obtained using natural-colored carpets instead of pre-colored or dyed ones. Natural-colored carpets are a very unforgiving surface, as stains cannot be hidden or camouflaged very well on them, and stain removal is more difficult (and more critical) on natural-colored carpets than on colored carpets. For example, one may observe that the product removes a cola stain from a brown carpet, but that it does not remove a like stain from a natural-colored carpet. The brown carpet hides the cola stain better than the natural-colored carpet does. Thus, even small percentages of stain removal on natural carpets may still be translated into satisfactory appearance levels on colored carpets.

EXAMPLES 1–33

Preparation of the Cleaning Solution of the Invention

A cleaning solution is prepared by mixing 139 parts deionized water, 51 parts of 35 percent hydrogen peroxide and 5 parts of 99 percent isopropyl alcohol. The pH of this solution is adjusted to 10 with saturated (29.4%) aqueous ammonia. The solution is placed in a spray bottle.

Staining Procedure

Squares (4"×4") of natural-colored (white) level-loop and cut-pile carpets are stained with 5 ml of each liquid substance as shown in Table 1 (or 1 g of each solid substance) at room temperature (70° F.). For each substance, one square is used as a stained control, and one is treated with the cleaning solution prepared above.

Measurement

After drying, the stains remaining on the treated and control squares are compared to an unstained natural-colored control using an ACS Colorimeter. The comparisons yielded the difference in "darkness" between the stained and unstained squares in terms of $\Delta L$. From this data, the amount of stain removed is calculated. The results are reported in Table 1.

TABLE 1

| Example | Stain Type | Loop-Pile Carpet Control Untreated (ΔL*) | Loop-Pile Carpet Treated with Invention (ΔL*) | Loop-Pile Carpet % Removed | Cut-Pile Carpet Control Untreated (ΔL*) | Cut-Pile Carpet Treated with Invention (ΔL*) | Cut-Pile Carpet % Removed |
|---|---|---|---|---|---|---|---|
| 1 | Mercurochrome | −32.90 | −5.79 | 82.4 | −45.13 | −4.53 | 90.0 |
| 2 | Ribena ™ Cordial | −4.79 | −2.85 | 40.5 | −27.25 | −3.74 | 86.3 |
| 3 | Grape Juice | −18.30 | −3.39 | 81.5 | −18.55 | −3.50 | 81.1 |
| 4 | Hot Beef Gravy | −7.83 | −26.17 | −234.2 | −32.19 | −9.37 | 70.9 |
| 5 | Hot Chocolate | −24.73 | −3.10 | 87.5 | −21.56 | −7.03 | 67.4 |
| 6 | Orange Juice | −7.37 | −3.01 | 59.2 | −11.07 | −3.92 | 64.6 |
| 7 | Hot Tea | −16.51 | −5.60 | 66.1 | −19.88 | −7.71 | 61.2 |
| 8 | Red Wine | −17.15 | −3.46 | 79.8 | −20.88 | −8.10 | 61.2 |
| 9 | Mustard | −35.35 | −24.03 | 32.0 | −37.78 | −18.77 | 50.3 |
| 10 | A1 ® Sauce | −64.13 | −22.10 | 65.5 | −66.33 | −38.52 | 41.9 |
| 11 | Ketchup | −61.00 | −35.34 | 42.1 | −61.57 | −37.92 | 38.4 |
| 12 | Blue Toilet Cleaner | −48.95 | −32.11 | 34.4 | −55.71 | −35.09 | 37.0 |
| 13 | Copier Toner | −75.56 | −75.89 | −0.4 | −74.46 | −52.51 | 29.5 |
| 14 | Clearasil ® ointment | −36.88 | −19.11 | 48.2 | −33.76 | −24.46 | 27.5 |
| 15 | Merthiolate | −6.36 | −3.68 | 42.1 | −6.24 | −4.71 | 24.5 |
| 16 | Hawaiian Punch ® | −18.54 | −13.41 | 27.7 | −22.22 | −17.41 | 21.6 |
| 17 | Cranberry Juice | −8.87 | −2.81 | 68.3 | −9.80 | −7.80 | 20.4 |
| 18 | Hot Tomato Soup | −33.57 | −13.83 | 58.8 | −5.81 | −4.87 | 16.2 |
| 19 | Betadine | −35.95 | −29.74 | 17.3 | −41.07 | −35.53 | 13.5 |
| 20 | Orange Soda | −9.61 | −7.62 | 20.7 | −9.94 | −8.85 | 11.0 |
| 21 | Liquid Shoe Polish | −68.77 | −65.84 | 4.3 | −70.48 | −67.28 | 4.5 |
| 22 | Black Hair Dye | −77.98 | −78.01 | 0.0 | −82.15 | −80.58 | 1.9 |
| 23 | Lipstick | −53.38 | −56.75 | −6.3 | −56.78 | −55.89 | 1.6 |
| 24 | Permanent Ink | −58.68 | −51.03 | 13.0 | −64.09 | −63.60 | 0.8 |
| 25 | Cherry Kool-Aid ® | −21.62 | −18.95 | 12.3 | −20.50 | −20.72 | −1.1 |
| 26 | Iodine | −44.83 | −42.11 | 6.1 | −53.76 | −55.13 | −2.5 |
| 27 | Orange Drink | −4.13 | −4.88 | −18.2 | −7.96 | −8.27 | −3.9 |
| 28 | Blackcurrant Cordial | −34.48 | −36.76 | −6.9 | −44.29 | −46.24 | −4.4 |
| 29 | Furniture Polish | −35.86 | −41.30 | −15.2 | −39.22 | −41.22 | −5.1 |
| 30 | Pepto Bismol ® | −15.77 | −17.06 | −8.2 | −15.57 | −21.52 | −38.2 |
| 31 | Oil | −4.20 | −6.31 | −50.2 | −3.79 | −6.02 | −58.8 |
| 32 | Cola | −3.65 | −2.31 | 36.7 | −1.98 | −4.05 | −104.5 |
| 33 | Gatorade ® | −6.89 | −3.62 | 47.5 | −0.72 | −6.36 | −783.3 |

What is claimed is:

1. A method of removing stains from stained synthetic polymer fiber comprising:

contacting said stained fiber with an effective amount of an aqueous cleaning composition having a pH of at least 9 and consisting essentially of:

(a) up to about 30 percent by total composition weight of a water-soluble wetting agent; and (b) between about 3 and about 15 percent by total composition weight of a peroxyhydrate oxidizing agent; and (c) a pH adjustment substance.

2. The method of claim 1 wherein said wetting agent is a water-soluble alcohol selected from the group of methyl alcohol, ethyl alcohol, n-propyl alcohol, isopropyl alcohol, sec-butyl alcohol, tert-butyl alcohol, and mixtures thereof.

3. The method of claim 1 wherein said peroxyhydrate is selected from the group of hydrogen peroxide, sodium peroxide, potassium peroxide, sodium perborate monohydrate, sodium perborate tetrahydrate, sodium persulfate, sodium percarborate, sodium peroxydihydrate, sodium peroxydiphosphate, potassium peroxydiphosphate, potassium carbonate peroxydihydrate, urea peroxide, and mixtures thereof.

4. The method of claim 1 wherein said stained synthetic polymer fibers are selected from a group consisting of polyamide, polyester, and polyolefin fibers.

5. The method of claim 1 wherein said wetting agent is present in said composition in an amount in the range of from about 1 to about 5 percent by total weight of said composition, said peroxyhydrate is present in an amount from about 10 percent by total weight of said composition.

6. The method of claim 5 wherein said peroxyhydrate is hydrogen peroxide, said wetting agent is isopropyl alcohol and said pH is adjusted to about 10 with ammonium hydroxide.

* * * * *